(12) United States Patent
Miriyala et al.

(10) Patent No.: US 8,223,673 B2
(45) Date of Patent: Jul. 17, 2012

(54) METHOD AND SYSTEM FOR SECURE CONFERENCING

(75) Inventors: Prasad Miriyala, Union City, CA (US); Fred Tada, Milpitas, CA (US); Praveen Konda, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1493 days.

(21) Appl. No.: 11/281,143

(22) Filed: Nov. 16, 2005

(65) Prior Publication Data

US 2007/0109978 A1 May 17, 2007

(51) Int. Cl.
*H04L 12/16* (2006.01)
*H04Q 11/00* (2006.01)
(52) U.S. Cl. .................. 370/260; 370/389; 379/392.01; 380/255; 713/153
(58) Field of Classification Search ................ None
See application file for complete search history.

(56) References Cited

U.S. PATENT DOCUMENTS

2003/0185369 A1* 10/2003 Oliver et al. ............. 379/202.01
2005/0084094 A1* 4/2005 Gass et al. ................... 379/416

OTHER PUBLICATIONS

M. Baugher, et al. "The Secure Real-time Transport Protocol (SRTP)." RFC 3711 (Standards Track). Mar. 2004.*
Baugher, et al. RFC 3711: The Secure Teal-time Transport Protocol (SRTP). Network Working Group. Standards: Mar. 2004.*
Cisco IOS Software Release "Media and Signaling Authentication and Encryption Feature on Cisco IOS MGCP Gateways", Acquired at http://www.cisco.com/en/US/products/sw/iosswrel/ps5207/products_feature_guide09186a0080357589.html#wp1093770 , 24 pages, 1992-2005, Copyright Cisco Systems.
Elliott, Colm; "Stream Synchronization for Voice Over IP Conference Bridges", Department of Electrical and Computer Engineering, McGill University, Montreal, Canada, Nov. 2004; 117 pages.

* cited by examiner

*Primary Examiner* — Asad M Nawaz
*Assistant Examiner* — Justin N Mullen
(74) *Attorney, Agent, or Firm* — Fish & Richardson P.C.

(57) ABSTRACT

Methods and systems for secure conferencing in a network have been provided. Relevant endpoints from the provided endpoints are selected on the basis of the endpoint selection parameters received in an SRTP extension. Data streams generated from the selected endpoints are decrypted and mixed, to obtain all the possible data stream mixes. A source identifier is inserted in all the possible data stream mixes. On the basis of source identifiers, endpoints can selectively receive any of the generated data streams.

20 Claims, 8 Drawing Sheets

METHOD AND SYSTEM FOR SECURE CONFERENCING

BACKGROUND OF THE INVENTION

1. Field of Invention

Embodiments of the invention relate in general to communication techniques for conferencing. More specifically, embodiments of the invention relate to methods and systems for secure communication in conferencing.

2. Description of the Background Art

Modern communication techniques enable multiple endpoints at remote locations for simultaneous communication over conference calls. The endpoints correspond to speakers as well as to the listeners of the conference calls. A conference call may be organized, for example, as a teleconference or a videoconference. A teleconference may be supported by audio, video and data transmission devices such as a telephone, a radio, a television or a computer. A videoconference may be supported by telephony and video devices such as a web cam and a close-circuit television.

In conference calls with multiple endpoints, all the endpoints are not generally considered to be speakers. Endpoints corresponding to speakers are hereinafter referred to as relevant endpoints, which are selected, based on predefined parameters for the selection of the endpoints. For example, the predefined parameters may include First Come First Serve (FCFS) and comparison of noise from an endpoint with a preset noise threshold. Further, the predefined parameters may include classification of the signals from the endpoints, such as speech or silence. This classification is performed by a Voice Activity Detector (VAD).

In a conventional method for secure conferencing, 'N' data streams are decrypted and generated from the provided N endpoints. Decryption, dejitter, decoding, and VAD processing are applied to each stream, so that a speaker selection algorithm may select up to 'M' data streams as the active speakers in the conference. When more than M data streams are active, the speaker selection algorithm may use additional criteria, such as the relative loudness, to make the selection. The data stream path through such a conference, from a source endpoint to a receiver endpoint, is processed as described further. Initially, SRTP data streams are generated from all the endpoints, followed by the decryption of the generated data streams. Thereafter, the process of decoding the data streams is performed, and Voice Activity Detector (VAD) processing is applied to select the relevant endpoints. If M endpoints are selected from a provided number of N endpoints, then audio mixing of M endpoints is performed. Thereafter, the mixed data streams are encoded. Further, a secure encryption of the encoded streams is performed. Finally, SRTP streams are received at the endpoints.

Therefore, in the conventional method, the conference has to incur the cost of decryption, dejitter, and VAD processing of all N endpoints, of which N–M endpoints are not considered as relevant endpoints in conferencing.

Conventionally, in a conference that has multiple endpoints, the endpoint receiver cannot monitor the decision, when to switch between the listener endpoint mix stream and one of the speaker endpoint mix streams. Therefore, it is difficult for an endpoint to receive any of the data streams selectively.

DETAILED DESCRIPTION OF EMBODIMENTS OF THE INVENTION

Various embodiments of the invention provide methods, systems and computer program products for secure conferencing. Various embodiments of the invention provide methods and systems for sending endpoint selection parameters in the clear text region of the Secure Real-time Transport Protocol (SRTP). Voice Activity Detector (VAD) of each endpoint sends relevant endpoint selection parameters to a conference bridge. Endpoints are selected on the basis of the relevant endpoint selection parameters. Further, a secure layer of data streams is generated from the data streams of the selected endpoints. 'Relevant endpoints' refer to the endpoints that are classified as speakers in the conference. The secure layer of data streams is then decrypted, and all possible mixes are generated from the decrypted data streams. Thereafter, the data streams are encrypted and a source identifier is inserted in each of the encrypted data streams. The encrypted data streams, with the inserted source identifiers, are distributed by multicasting at the endpoints. Accordingly, the endpoints can selectively receive any of the encrypted data streams, based on the source identifiers.

Figure 1:
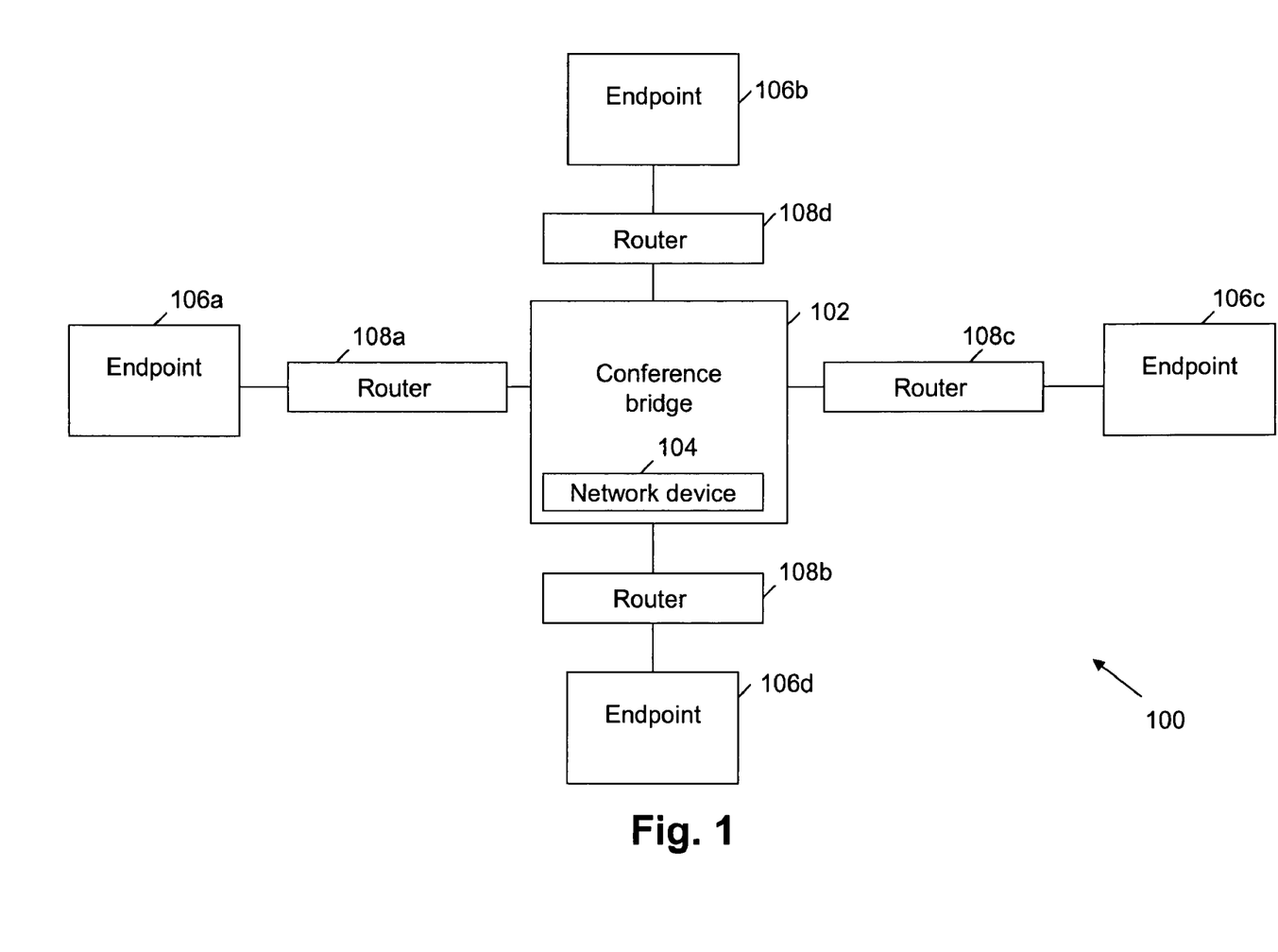
FIG. 1 illustrates a network environment for secure conferencing, in accordance with various embodiments of the invention.

FIG. 1 illustrates a network environment 100 for secure conferencing, in accordance with various embodiments of the invention. Network environment 100 includes a conference bridge 102, a network device 104, endpoints 106 such as endpoints 106a, 106b, 106c and 106d, and routers 108 such as routers 108a, 108b, 108c, and 108d. Conference bridge 102 can be, for example, a centralized conference bridge, a select and forward conference bridge, or a synchronized conference bridge. Conference bridge 102 sums up the input signals from each endpoint 106. Subsequently, conference bridge 102 supplies the sum of the signals to each endpoint 106. Endpoints 106 can be, for example, any devices that include means of communication. Examples of endpoints 106 include, but are not limited to, computers, Voice Over Internet Protocol (VOIP) devices, wireless phones, Personal Digital Assistants (PDAs), and fixed-line phones.

In accordance with various embodiments of the invention, endpoints 106 that are classified as speakers are selected as relevant endpoints. Data streams from selected endpoints 106 are sent to desired endpoints 106 through routers 108 present in network environment 100. Routers 108 act as intermediates, transferring data packets between endpoints 106 and conference bridge 102.

Conference bridge 102 includes network device 104. Network device 104 helps in selecting relevant endpoints 106, mixing the selected data streams, inserting source identifiers in the encrypted streams, and distributing data streams by multicasting.

Figure 2:
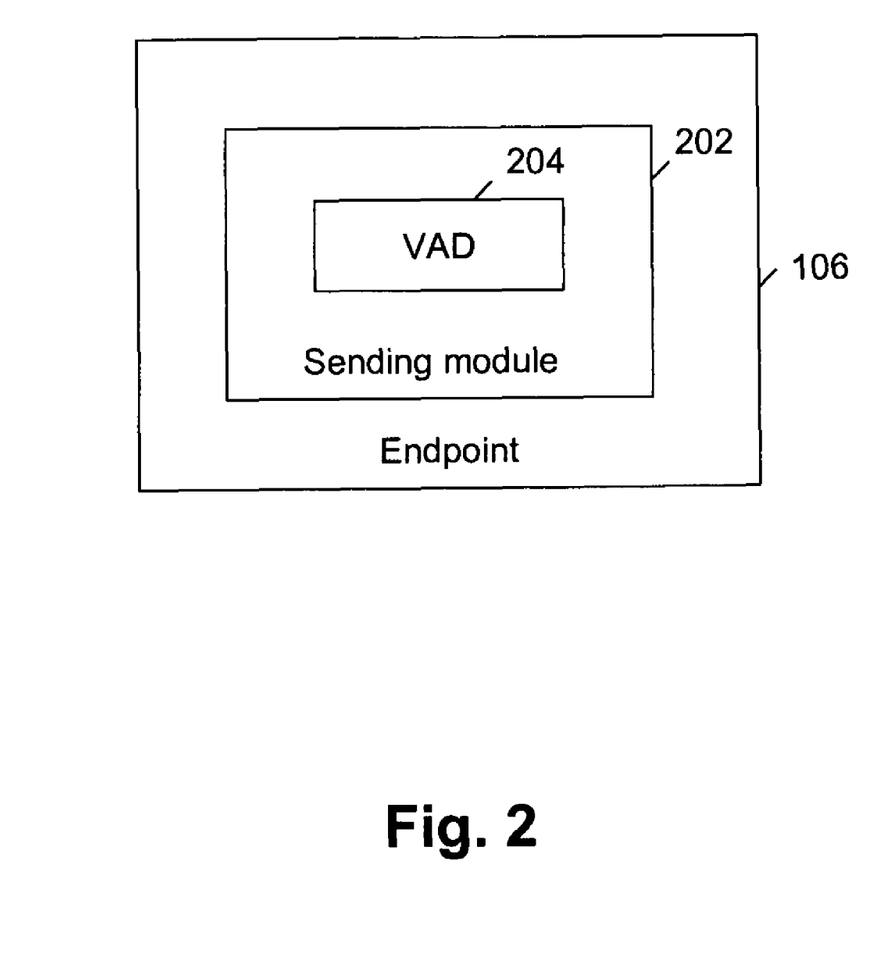
FIG. 2 illustrates an endpoint, in accordance with an embodiment of the invention.

FIG. 2 illustrates endpoint 106, in accordance with an embodiment of the invention. In accordance with various embodiments of the invention, each endpoint 106 includes a sending module 202. Sending module 202 sends the relevant endpoint selection parameters on the basis of the classification of data streams by a Voice Activity Detector (VAD) 204. The relevant endpoint selection parameters can include voice activity decision, signal level measurements, inactivity interval, and a time index indicating the beginning of talk spurt. The parameters may be provided in separate predefined fields. In accordance with an embodiment, the parameters may be compressed, or combined into a single composite parameter. In accordance with various embodiments of the invention, sending module 202 includes VAD 204, which assigns a binary value to a frame of speech from the data streams generated from endpoints 106. In accordance with various embodiments, the binary value is assigned, based on the classification of the frame of speech, as speech or silence. For example, a frame of speech is assigned the value of '1' if it is classified as speech and '0' if it is classified as silence. VAD 204 classifies a frame of speech as speech or silence, based on a comparison between the average energy of the input data stream and a preset noise threshold. The binary value assigned by VAD 204 is sent to conference bridge 102 by sending module 202. In an embodiment of the invention, sending module 202 sends the binary value assigned by VAD 204 in the clear text region of the Secure Real-time Transport Protocol (SRTP) extension as unencrypted endpoint selection parameters. The SRTP provides end-to-end network transport functions that are suitable for applications transmitting real time data such as audio, video or simulation data over multicast or unicast network services. In an embodiment of the invention, VAD 204 can be included in an intermediate device in network environment 100. The intermediate device may be, for example, any computing device that is located between endpoint 106 and conference bridge 102.

Figure 3:
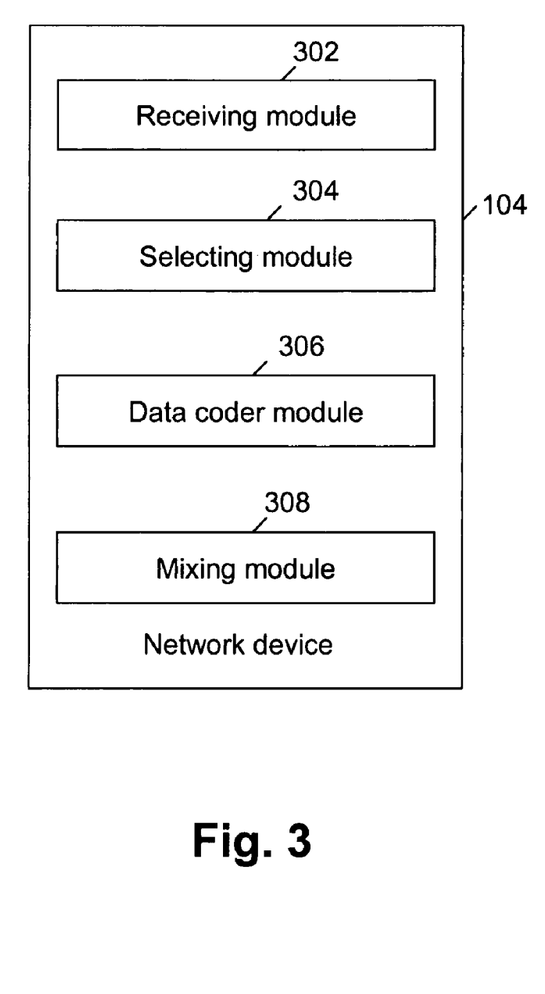
FIG. 3 illustrates a network device, in accordance with an embodiment of the invention.

FIG. 3 illustrates network device 104, in accordance with an embodiment of the invention. In accordance with various embodiments of the invention, network device 104 includes a receiving module 302, a selecting module 304, a data coder module 306, and a mixing module 308. Receiving module 302 receives the relevant endpoint selection parameters sent by VAD 204 on the basis of the classification of data streams. The relevant endpoint selection parameters can include voice activity decision, signal level measurements, inactivity interval, and a time index indicating the beginning of talk spurt. Selecting module 304 selects 'M' relevant endpoints 106 from provided 'N' endpoints 106 connected through conference bridge 102. The selection is performed on the basis of the endpoint selection parameters received by receiving module 302. The data streams from selected M endpoints 106 are encrypted by data coder module 306. In an embodiment of the invention, data coder module 306 also decrypts the encrypted data streams. Mixing module 308 generates all possible mixes of the decrypted data streams. Further, the generated streams are encrypted by data coder module 306. In an embodiment of the invention, mixing module 308 inserts a source identifier in each of the encrypted data streams, after which the data streams are distributed by multicasting at endpoints 106.

Figure 4:
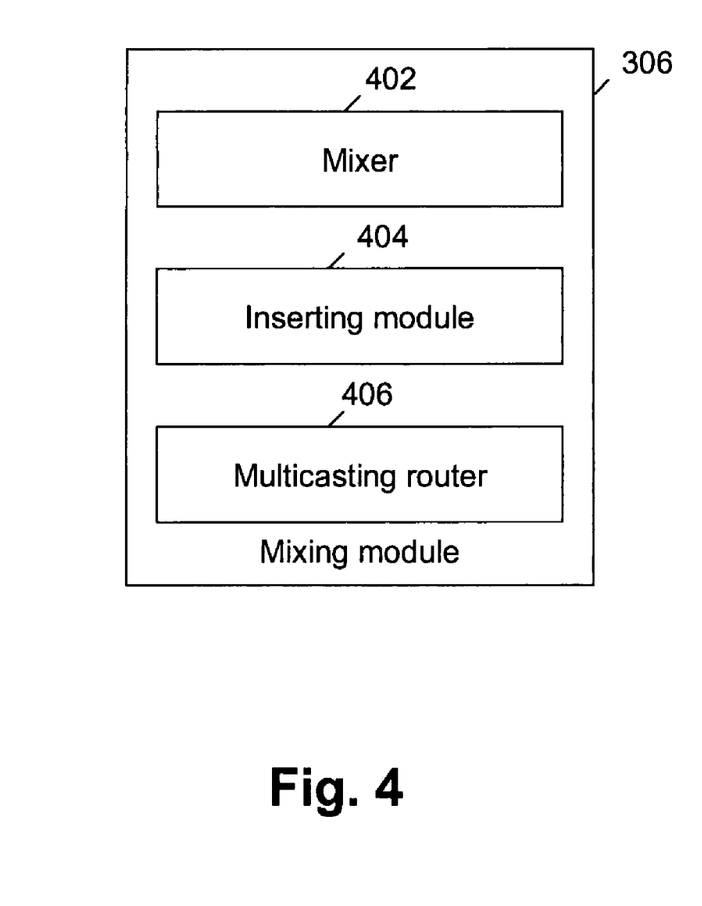
FIG. 4 illustrates the various units of a mixing module, in accordance with an embodiment of the invention.

FIG. 4 illustrates the various units of mixing module 308, in accordance with an embodiment of the invention. In accordance with various embodiments of the invention, mixing module 308 includes a mixer 402, an inserting module 404, and a multicasting router 406. Mixer 402 mixes the decrypted data streams from 'M−1' endpoints 106, and then generates all the possible data streams to be distributed by multicasting.

In an embodiment of the invention mixer 402 mixes the decrypted streams from M endpoints 106, to generate all the possible data streams to be distributed by multicasting. While generating all the possible data streams, mixer 402 ensures that contributions from given endpoint 106 are not sent back to same endpoint 106. Therefore, mixer 402 generates a different composite data stream for each of selected M endpoint 106. If all provided N endpoints 106 are selected, then M is equal to N. In this situation, mixer 402 generates M data streams, which each endpoint 106 receives as a unique data stream summation comprised of the other 'M−1' data streams. In another embodiment of the invention where M is less then N, there are different 'M+1' composite data streams generated by mixer 402. Of the generated M+1 data streams, M data streams are generated, to be received by M endpoints 106 in the conference. Further, an additional data stream is generated, to be received by the remaining 'N−M' endpoints 106 in the conference.

The mixing of the data streams is followed by their encryption by data coder module 306. Further, inserting module 404 inserts the source identifier in the encrypted data streams. The source identifier can be, for example, synchronization source identifier (SSRC) and contributing source identifiers (CSRC). The SSRC identifies endpoint 106 from which the data stream has originally generated. Each data stream has a different SSRC, which is a number that is randomly assigned when a new data stream is generated. When mixer 402 mixes the decrypted data streams, and generates all possible streams, inserting module 404 inserts the SSRC of each of the original decrypted streams as a list in the CSRC. The CSRC enables endpoint 106 to detect changes in the source. Endpoint 106 can detect the change by checking the list of SSRCs included in the CSRC. Therefore, in accordance with various embodiments, a data stream can be selectively discarded when endpoint 106 is an active speaker.

Further, detection of changes in the source can facilitate providing source specific treatment to respective streams. For example, an independent gain may be applied to the data streams. The source identifier facilitates the selection of the desired data stream by endpoints 106. Endpoints 106 can selectively receive any of the data streams on the basis of examination of the list contained in the CSRC.

After the insertion of the source identifier, the encrypted data stream is distributed by multicasting router 406 in a multicast process. Multicast is a one to many operation process. In an embodiment of the invention, when endpoints 106 are connected by multicasting router 406 then conference bridge 102 generates only one output data stream for the entire multicast group. A multicast group is defined as a group where each endpoint 106 is connected to multicasting router 406. The network replicates the data streams and forwards the replicas by multicasting router 406 to each endpoint 106 connected in the multicast group.

Figure 5:
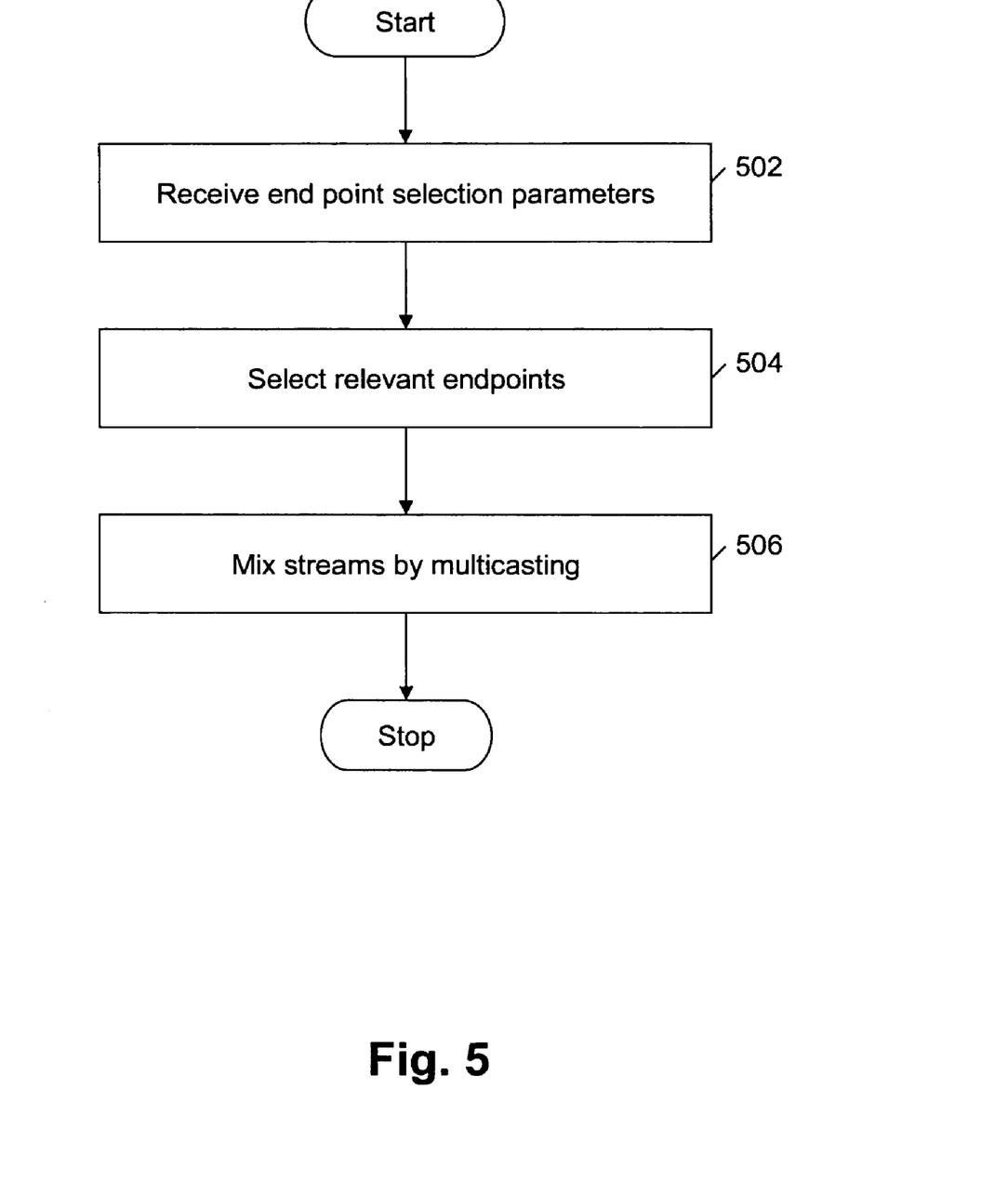
FIG. 5 is a flowchart illustrating a method for secure conferencing, in accordance with various embodiments of the invention.

FIG. 5 is a flow chart illustrating a method for secure conferencing, in accordance with various embodiments of the invention. At step 502, receiving module 302 receives the relevant endpoint selection parameters in the clear text region of the SRTP. In an embodiment of the invention, receiving module 302 receives the relevant endpoint selection parameters at conference bridge 102 in the clear text region of the RTP. At step 504, selecting module 304, selects relevant M number of endpoints 106 from the provided N number of endpoints 106. The selection is performed on the basis of the received relevant selection endpoint parameters. Once M endpoints 106 are selected, a layer of SRTP data streams is generated from M endpoints 106. Generated data streams are then decrypted by data coder module 306. At step 506, decrypted data streams are mixed by mixer 402 to generate all possible data streams. The generated data streams are then encrypted and distributed by multicasting at endpoints 106.

Figure 6:
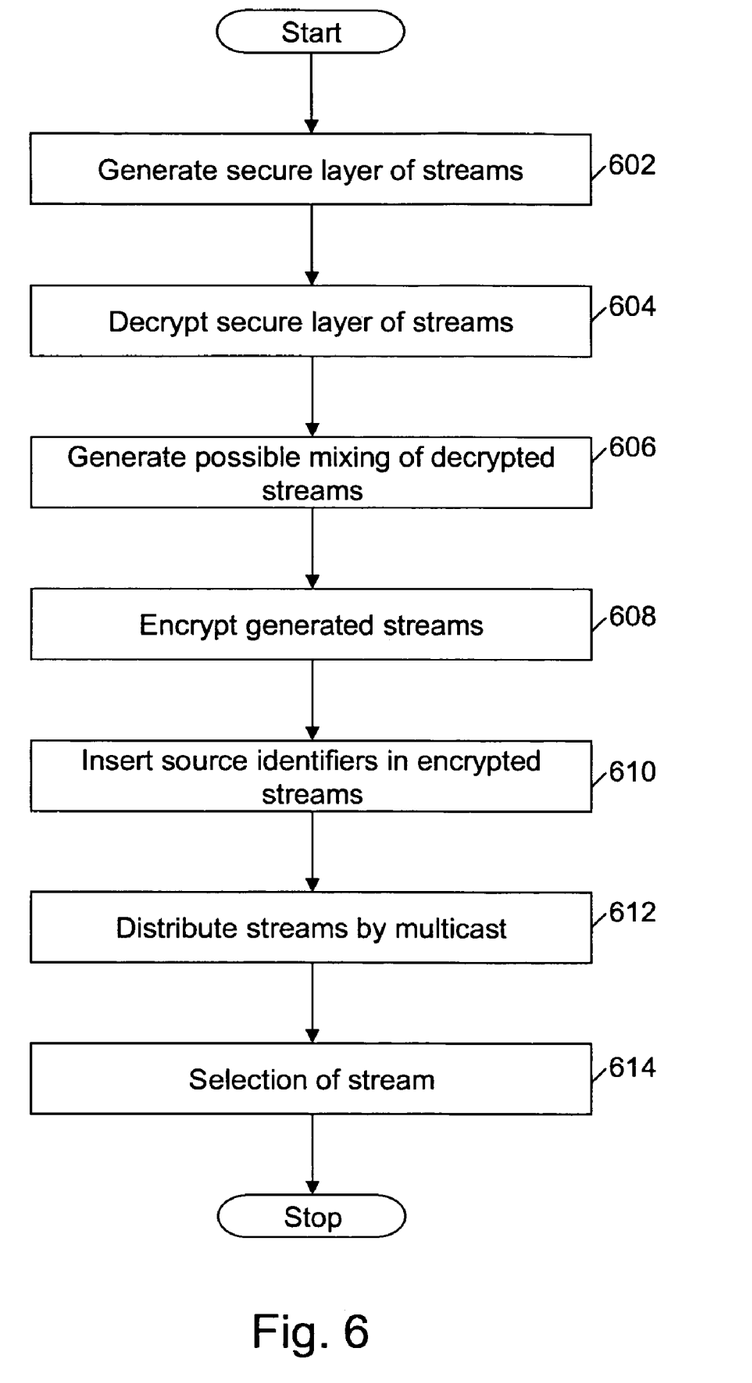
FIG. 6 is a flowchart illustrating a method for the selection of a data stream by an endpoint, in accordance with an embodiment of the invention.

FIG. 6 is a flowchart illustrating a method for the selection of a data stream by endpoint 106, in accordance with an embodiment of the invention. Once relevant M endpoints 106 are selected, then, at step 602, a secure layer of SRTP data streams is generated from M endpoints 106. At step 604, the generated data streams are decrypted by data coder module 306. Thereafter, at step 606, mixing of the data streams is carried out by mixer 402, to generate all possible data streams. Then, at step 608, the data streams generated by mixer 402 are encrypted by data coder module 306. At step 610, inserting module 404 inserts a source identifier in each of the encrypted data streams. The source identifier is a list of the SSRCs of the individual data streams before mixing. Once the source identifier is inserted, then, at step 612, the encrypted data streams are distributed at endpoints 106 by multicasting. Multicasting at endpoints 106 is carried out by multicasting routers 406 in mixing module 308. At step 614, endpoints 106 selectively receive any of the encrypted data streams on the basis of an inserted source identifier.

Figure 7:
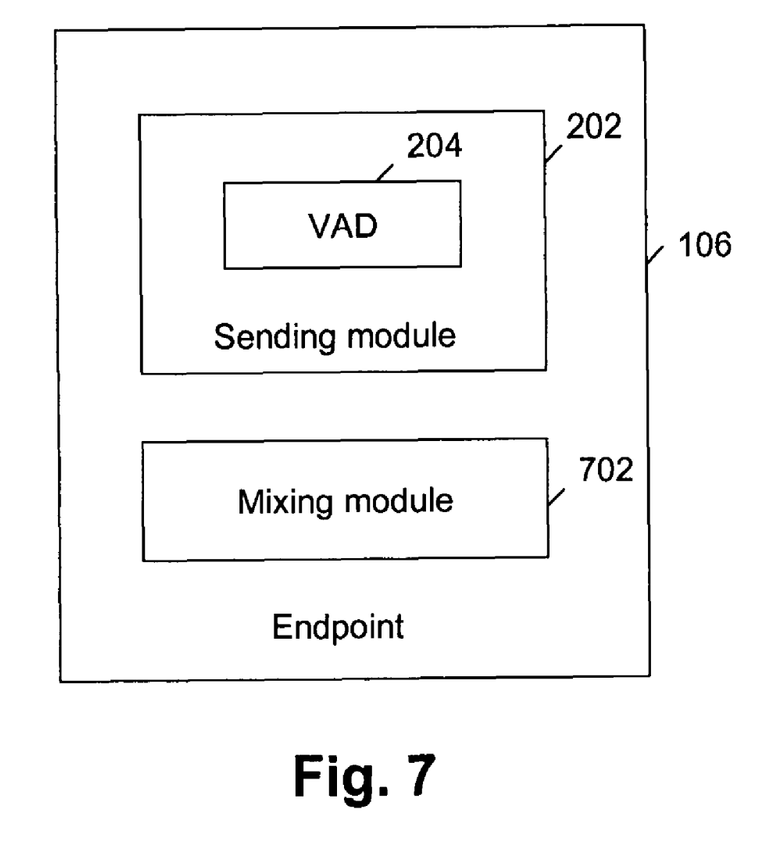
FIG. 7 illustrates an endpoint, in accordance with an embodiment of the invention.

In accordance with an embodiment of the invention, the mixing of decrypted data streams is performed at endpoints 106 instead of conference bridge 102. FIG. 7 illustrates endpoint 106, in accordance with an embodiment of the invention. Each endpoint 106 includes a mixing module 702, along with sending module 202 and VAD 204 as described with reference to FIG. 2. Mixing module 702 performs the mixing of the decrypted data streams at endpoint 106.

Figure 8:
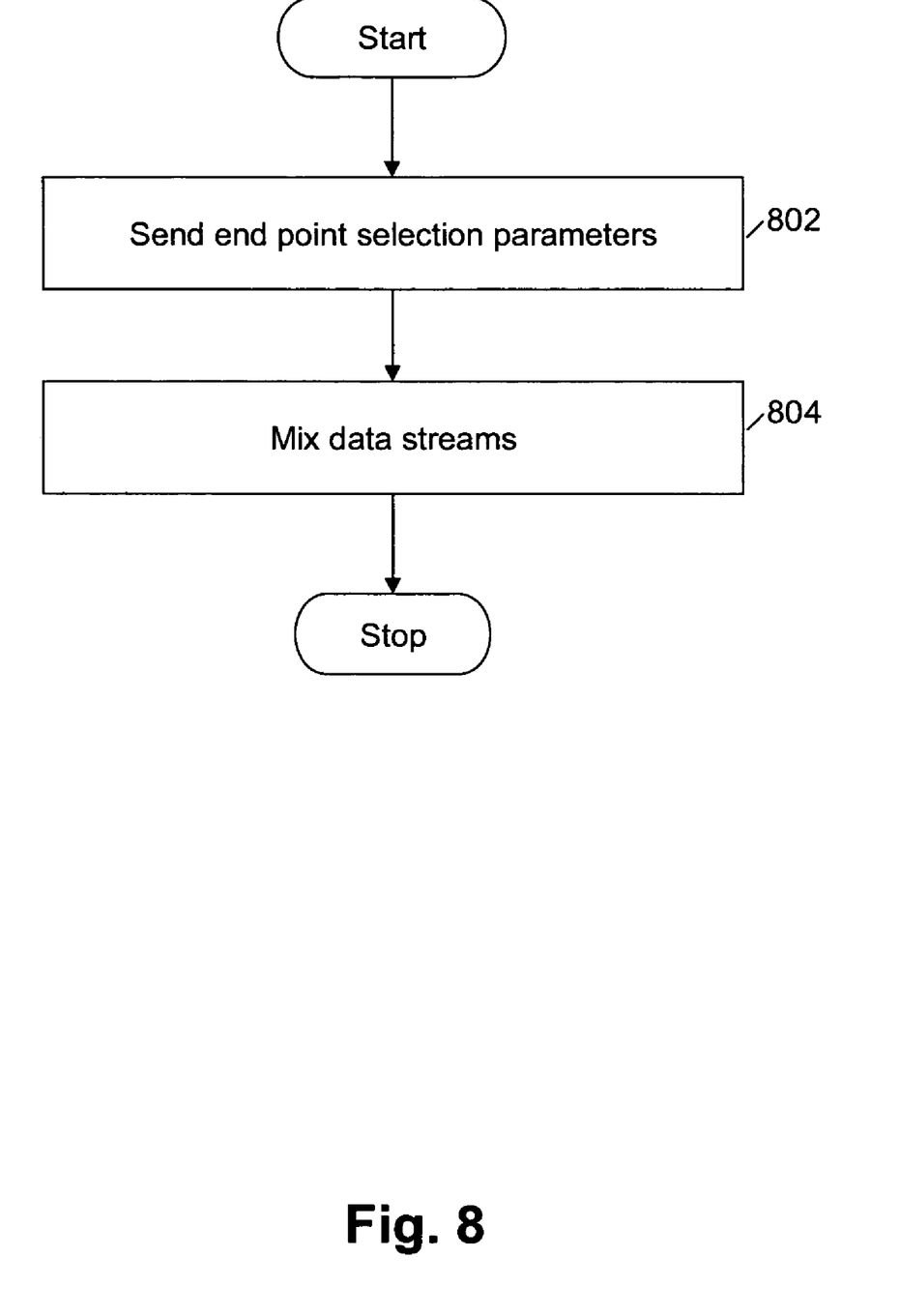
FIG. 8 is a flow chart illustrating a method for secure conferencing, in accordance with an embodiment of the invention.

FIG. 8 is a flow chart illustrating a method for secure conferencing, in accordance with various embodiments of the invention. At step 802, sending module 202, sends the relevant endpoint selection parameters in the clear text region of the SRTP. In an embodiment of the invention, sending module 202 sends the relevant endpoint selection parameters to conference bridge 102 in the clear text region of the RTP. On the basis of the sent endpoint relevant selection parameters, selecting module 202, selects relevant M number of endpoints 106 from the provided N number of endpoints 106. Once M endpoints 106 are selected, a layer of SRTP data streams is generated from M endpoints 106. Generated data streams are then decrypted by a data coder module 306.

Further, at step 804, mixing of the data streams is performed at endpoints 106. In accordance with an embodiment of the invention, the mixing of the decrypted data streams is performed by mixing module 702 included in each endpoint 106.

In an embodiment of the invention, the unencrypted VAD 204 parameters are sent in a clear text region of the SRTP packet. In another embodiment of the invention, the VAD 204 parameters can be sent in the clear text region of the RTP extension. Relevant endpoints 106 are selected on the basis of the sent VAD 204 parameters. Data streams from selected endpoints 106 are generated for mixing by mixing module 308. Thereafter, the data streams are forwarded to desired endpoints 106.

In an embodiment of the invention, the cryptographic context of all the provided endpoints is maintained. The cryptographic context includes parameters that are necessary to process an SRTP stream. The parameters include state dependent or time varying items such as Roll Over Counter and replay list that must be maintained. Further, an invalid context may cause undesirable results during SRTP processing.

In an embodiment of the invention, mixing of the data streams can be performed at endpoints 106. In another embodiment of the invention, once mixing of data streams is performed by mixer 402, present in the conference bridge 102, the data streams can be distributed by multicasting to endpoints 106. Multicast is a one to many operation process. In an embodiment of the invention, when endpoints 106 are connected by multicasting router 406, conference bridge 102 generates only one output data stream for the entire multicast group. A multicast group is defined as a group in which each endpoint 106 is connected to multicasting router 406. The network replicates the data streams and forwards the replicas by multicasting router 406 to each endpoint 106 connected to the multicast group.

In an embodiment of the invention, the data streams that are identified as generated from relevant endpoints 106 are distributed by multicast to endpoints 106. Further, these are selectively mixed at endpoints 106 by mixing module 308. In accordance with various embodiments, mixing of all selected data streams takes place at endpoints 106, except the data streams that are generated from the same endpoints 106. Relevant endpoints 106 are referred to endpoints 106, which are selected on the basis of the sent VAD parameters.

In an embodiment of the invention, the data streams generated from the relevant endpoints 106 (M) from provided number of endpoints 106 (N) are mixed by mixing module 308. Mixer 402, present in mixing module 308, generates all the possible mixes from the data streams. While generating all the possible data streams, mixer 402 ensures that contributions from a given endpoint 106 are not sent back to same endpoint 106. Therefore, mixer 402 generates a different composite data stream for each selected M endpoint 106. If all provided endpoints 106 (N) are selected, then M is equal to N. In this situation, mixer 402 generates M data streams, which each endpoint 106 receives as a unique data stream summation comprised of the other 'M−1' data streams. In another embodiment of the invention where M is less then N, there are different 'M+1' composite data streams generated by mixer 402. Of the generated M+1 data streams, M data streams are generated, to be sent to each of M endpoints 106 in the conference. Further, an additional data stream is generated to be sent to remaining 'N−M' endpoints 106 in the conference. Once all the data streams are generated by mixer 402, inserting module 404 inserts source identifiers in each of the data streams. Endpoints 106 can selectively receive any of the data streams on the basis of the source identifiers, since source identifiers enable endpoints 106 to determine when to switch between listener endpoint 106 data stream and one of M speaker endpoint 106 data streams. Listener endpoints 106 correspond to 'N−M' endpoints 106 and speaker endpoints 106 corresponds to M endpoints 106.

In accordance with various embodiments of the invention, the decryption, the dejitter, the decoding and VAD 204 processing of non-relevant endpoints 106 is avoided. Various embodiments of the invention generate all possible mixes of data streams with the insertion of a source identifier. This enables endpoints 106 to determine when to switch between the listener endpoint 106 data stream and one of the speaker endpoint 106 data streams on the basis of the source identifier. Therefore, the complexity of endpoint 106 receiver is limited to a single secure data stream.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In addition, in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. In addition, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for secure conferencing, the method comprising:
    receiving, using a conference bridge, endpoint selection parameters associated with one or more endpoints that are participating in secure conferencing, wherein the endpoint selection parameters include information indicating endpoints that comprise live audio during the secure conferencing, wherein the endpoint data streams are encrypted using Secure Real-time Transport Protocol (SRTP), wherein the endpoint selection parameters are sent using a clear text section of SRTP packets;

selecting, using the conference bridge, a subset of the endpoints based on the received endpoint selection parameters;

decrypting, using the conference bridge, a secure layer of encrypted data streams associated with the endpoints that are included in the selected subset of the endpoints;

generating, using the conference bridge, a number of mixed data streams, wherein each mixed data stream is generated by combining a subset of the decrypted data streams, wherein the number of mixed data streams is determined based on the selected subset of the endpoints, and wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream;

encrypting, using the conference bridge, the mixed data streams; and distributing, using the conference bridge, the encrypted mixed data streams by multicasting the encrypted mixed data streams to the one or more endpoints participating in the secure conferencing, wherein the conference bridge generates an output data stream for a multicast group.

2. The method of claim 1, wherein the endpoints that are included in the selected subset of the endpoints are associated with speakers of the live audio in the conference and the other endpoints participating in the secure conferencing are associated with listeners in the conference.

3. The method of claim 1, wherein receiving the endpoint selection parameters in a clear text section of an SRTP packet comprises receiving the endpoint selection parameters in a Real-time Transport Protocol (RTP) extension.

4. The method of claim 1, further comprising maintaining cryptographic context for data streams associated with the endpoints participating in the secure conferencing, wherein the cryptographic context is maintained at the conference bridge, wherein the maintaining the cryptographic context comprises tracking Roll Over Counter (ROC) in Advanced Encryption Standard in Counter mode (AES-CTR).

5. The method of claim 1, wherein generating a number of mixed data streams includes generating at least as many mixed data streams as a number of endpoints in the selected subset of the endpoints.

6. The method of claim 5, wherein the number of mixed data streams generated is one more than a number of endpoints in the selected subset of the endpoints.

7. The method of claim 1, wherein generating the mixed data streams generates a different composite data stream for each endpoint in the selected subset of the endpoints.

8. A method for secure conferencing, the method comprising: sending, using an endpoint, endpoint selection parameters to a conference bridge, wherein the endpoint selection parameters include information indicating whether the endpoint comprises live audio during secure conferencing, wherein the endpoint data streams are encrypted using a Secure Real-time Transport Protocol (SRTP), wherein the endpoint selection parameters are transmitted using a clear text section of SRTP packets;

receiving, using the conference bridge, the endpoint selection parameters associated with one or more endpoints that are participating in the secure conferencing;

selecting, using the conference bridge, a subset of the endpoints based on the received endpoint selection parameters;

decrypting, using the conference bridge, a secure layer of encrypted data streams associated with the endpoints that are included in the selected subset of the endpoints;

generating, using the endpoint, a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream;

encrypting, using the conference bridge, the mixed data streams;

distributing, using the conference bridge, the encrypted mixed data streams by multicasting the encrypted mixed data streams to the one or more endpoints participating in the secure conferencing, wherein the conference bridge generates an output data stream for a multicast group; and receiving, using the endpoint, one or more of the encrypted mixed data streams, wherein the one or more encrypted mixed data streams that are received by the endpoint are received based on the source identifiers included in the encrypted mixed data streams.

9. A system for secure conferencing, the system comprising:

a conference bridge configured to receive endpoint selection parameters associated with one or more endpoints that are participating in secure conferencing, wherein the endpoint selection parameters include information indicating endpoints that comprise live audio during the secure conferencing, wherein data streams for the one or more endpoints are encrypted using Secure Real-time Transport Protocol (SRTP), wherein the endpoint selection parameters are transmitted using a clear text section of SRTP packets;

one or more processors; and one or more instructions encoded in non-transitory machine-readable medium for execution by the one or more processors and when executed by the one or more processors are operable to:

select, using the conference bridge, a subset of the endpoints based on the received endpoint selection parameters;

decrypt, using the conference bridge, a secure layer of encrypted data streams associated with the endpoints that are included in the selected subset of the endpoints;

generate, using the conference bridge, a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream;
encrypt, using the conference bridge, the mixed data streams; and
distribute, using the conference bridge, the encrypted mixed data streams by multicasting the encrypted mixed data streams to the one or more endpoints participating in the secure conferencing, wherein the conference bridge generates an output data stream for a multicast group.

10. A system for secure conferencing, the system comprising:
an endpoint configured to send endpoint selection parameters to a conference bridge, wherein the endpoint selection parameters include information indicating whether the endpoint comprises live audio during secure conferencing, wherein data streams for the endpoint are encrypted using Secure Real-time Transport Protocol (SRTP), wherein the endpoint selection parameters are transmitted using a clear text section of SRTP packets;
one or more processors; and
one or more instructions encoded in non-transitory machine-readable medium for execution by the one or more processors and when executed by the one or more processors are operable to:
receive, using the conference bridge, endpoint selection parameters associated with one or more endpoints that are participating in the secure conferencing;
select, using the conference bridge, a subset of the endpoints based on the received endpoint selection parameters;
decrypt, using the conference bridge, a secure layer of encrypted data streams associated with the endpoints that are included in the selected subset of the endpoints;
generate, using the endpoint, a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream;
encrypt, using the conference bridge, the mixed data streams;
distribute, using the conference bridge, the encrypted mixed data streams by multicasting the encrypted mixed data streams to the one or more endpoints participating in the secure conferencing, wherein the conference bridge generates an output data stream for a multicast group; and
receive, using the endpoint, one or more of the encrypted mixed data streams, wherein the one or more encrypted mixed data streams that are received by the endpoint are received based on the source identifiers included in the encrypted mixed data streams.

11. A system comprising:
one or more processors configured for secure conferencing;
a receiving module including instructions encoded in a non-transitory machine-readable medium for execution by the one or more processors and configured to cause the processors to receive endpoint selection parameters associated with one or more endpoints that are participating in secure conferencing, wherein the endpoint selection parameters include information indicating endpoints that comprise live audio during the secure conferencing, wherein the endpoint data streams are encrypted using Secure Real-time Transport Protocol (SRTP), wherein the endpoint selection parameters are transmitted using a clear text section of SRTP packets;
a selecting module including instructions encoded in a non-transitory machine-readable medium for execution by the one or more processors and configured to cause the processors to select a subset of the endpoints based on the received endpoint selection parameters;
a data coder module including instructions encoded in a non-transitory machine-readable medium for execution by the one or more processors and configured to cause the processors to decrypt a secure layer of encrypted data streams associated with the endpoints that are included in the selected subset of the endpoints;
a mixing module including instructions encoded in a non-transitory machine-readable medium for execution by the one or more processors and configured to cause the processors to generate a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) indicating endpoints associated with constituent decrypted data streams, wherein a mixer included in the mixing module is configured to combine a subset of the decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream, and
wherein the mixing module is configured for distributing the encrypted mixed data streams by multicasting the encrypted mixed data streams to the one or more endpoints participating in the secure conferencing, wherein the mixing module generates an output data stream for a multicast group; and
a data coder module including instructions encoded in a non-transitory machine-readable medium for execution by the one or more processors and configured to cause the processors to encrypt the mixed data streams.

12. The system of claim 11, wherein the mixing module comprises a multicasting router for distributing the encrypted mixed data streams by multicasting.

13. The system of claim 11, wherein a data coder module for encrypting mixed data streams is same as the data coder module for decrypting a secure layer of encrypted data streams associated with the endpoints that are included in the selected subset of the endpoints.

14. A system comprising:
one or more processors configured for secure conferencing; and
a plurality of endpoints, each endpoint comprising:
a sending module including instructions encoded in a non-transitory machine-readable medium for execution by the one or more processors and configured to cause the processors to send endpoint selection parameters to a conference bridge, wherein the endpoint selection parameters include information indicating whether the endpoint comprises live audio during secure conferencing, wherein the endpoint data streams are encrypted using a Secure Real-time Transport Protocol (SRTP), wherein the endpoint selection parameters are transmitted using a clear text section of SRTP packets; and a mixing module including instructions encoded in a non-transitory machine-readable medium for execution by the one or more processors and configured to cause the processors to generate a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) indicating endpoints associated with constituent decrypted data streams, wherein a mixer included in the mixing module is configured to combine a subset of the decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream, and wherein the mixing module is configured for distributing the encrypted mixed data streams by multicasting the encrypted mixed data streams to the one or more endpoints participating in the secure conferencing, wherein the mixing module generates an output data stream for a multicast group.

15. The system of claim 14, wherein the sending module comprises a Voice Activity Detector (VAD).

16. An apparatus for secure conferencing, the apparatus comprising:

a user input device;

a display unit;

a processing system including a processor coupled to the display unit and the user input device;

a machine-readable medium including one or more instructions executable by the processor, the one or more instructions when executed by the processor cause the processor to perform operations including:

receiving, using a conference bridge, endpoint selection parameters associated with one or more endpoints that are participating in secure conferencing, wherein the endpoint selection parameters include information indicating endpoints that comprise live audio during the secure conferencing, wherein the endpoint data streams are encrypted using a Secure Real-time Transport Protocol (SRTP), wherein the endpoint selection parameters are transmitted using a clear text section of SRTP packets;

selecting, using the conference bridge, a subset of the endpoints based on the received endpoint selection parameters;

decrypting, using the conference bridge, a secure layer of encrypted data streams associated with the endpoints that are included in the selected subset of the endpoints;

generating, using the conference bridge, a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) to indicate endpoints associated with constituent decrypted data streams, each mixed data stream further including synchronization source identifiers (SS-RCs) that indicate the endpoints that are associated with the decrypted generated data streams included in the mixed data stream, wherein the SSRCs are included in the CSRC associated with the mixed data stream;

encrypting, using the conference bridge, the mixed data streams; and distributing, using the conference bridge, the encrypted mixed data streams by multicasting the encrypted mixed data streams to the one or more endpoints participating in the secure conferencing, wherein the conference bridge generates an output data stream for a multicast group.

17. An apparatus for secure conferencing, the apparatus comprising:

a display unit;

a user input device;

a processing system including a processor coupled to the display unit and the user input device;

a machine-readable medium including one or more instructions executable by the processor, the one or more instructions when executed by the processor cause the processor to perform operations comprising:

sending, using an endpoint, endpoint selection parameters to a conference bridge, wherein the endpoint selection parameters include information indicating whether the endpoint comprises live audio during secure conferencing, wherein the endpoint data streams are encrypted using a Secure Real-time Transport Protocol (SRTP), wherein the endpoint selection parameters are transmitted using a clear text section of SRTP packets;

receiving, using a conference bridge, the endpoint selection parameters associated with one or more endpoints that are participating in the secure conferencing;

selecting, using the conference bridge, a subset of the endpoints based on the received endpoint selection parameters;

decrypting, using the conference bridge, a secure layer of encrypted data streams associated with the endpoints that are included in the selected subset of the endpoints;

generating, using an endpoint, a number of mixed data streams, wherein each mixed data stream is generated by combining a subset of the decrypted data streams where the number of mixed data streams is determined based on the selected subset of the endpoints, wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream;

encrypting, using the conference bridge, the mixed data streams;

distributing, using the conference bridge, the encrypted mixed data streams by multicasting the encrypted mixed data streams to the one or more endpoints participating in the secure conferencing, wherein the conference bridge generates an output data stream for a multicast group; and receiving, using the endpoint, one or more encrypted mixed data streams, wherein the one or more encrypted mixed data streams that are received by the endpoint is based on the source identifiers included in the encrypted mixed data streams.

18. A non-transitory machine-readable medium including one or more instructions executable by a processor using a conference bridge, the one or more instructions when executed by the processor cause the processor to performing operations to:

receive endpoint selection parameters associated with one or more endpoints that are participating in secure conferencing, wherein the endpoint selection parameters include information indicating endpoints that comprise live audio during the secure conferencing, wherein the endpoint data streams are encrypted using a Secure Real-time Transport Protocol (SRTP), wherein the endpoint selection parameters are transmitted using a clear text section of SRTP packets;

select a subset of the endpoints based on the received endpoint selection parameters;

decrypt a secure layer of encrypted data streams associated with the endpoints that are included in the selected subset of the endpoints;

generate a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream;

encrypt the mixed data streams; and distribute the encrypted mixed data streams by multicasting the encrypted mixed data streams to the one or more endpoints participating in the secure conferencing, wherein the processor generates an output data stream for a multicast group.

19. A non-transitory machine-readable medium including one or more instructions executable by a processor using an endpoint, the one or more instructions when executed by the processor cause the processor to performing operations to:

send endpoint selection parameters to a conference bridge, wherein the endpoint selection parameters include information indicating whether the endpoint comprises live audio during secure conferencing, wherein the endpoint data streams are encrypted using a Secure Real-time Transport Protocol (SRTP), wherein the endpoint selection parameters are sent using a clear text section of SRTP packets;

generate a number of mixed data streams, wherein each mixed data stream is generated by combining a subset of data streams decrypted using the conference bridge, wherein the number of mixed data streams is determined based on a subset of the endpoints selected using the conference bridge, wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream; and receive, using the endpoint, one or more encrypted mixed data streams multicasting, wherein the one or more encrypted mixed data streams that are received by the endpoint are received based on the source identifiers included in the encrypted mixed data streams, and wherein an output data stream is generated for a multicast group.

20. A method for secure conferencing, the method comprising: receiving, using a conference bridge, endpoint selection parameters associated with one or more endpoints that are participating in secure conferencing, wherein the endpoint selection parameters include information indicating endpoints that comprise live audio during the secure conferencing, wherein the endpoint data streams are encrypted using a Secure Real-time Transport Protocol (SRTP), wherein the endpoint selection parameters are transmitted using a clear text section of SRTP packets;

selecting, using the conference bridge, a subset of the endpoints based on the received endpoint selection parameters;

decrypting, using the conference bridge, a secure layer of encrypted data streams associated with the endpoints that are included in the selected subset of the endpoints;

generating, using the conference bridge, a number of mixed data streams, wherein each mixed data stream is generated by combining a subset of the decrypted data streams, wherein the number of mixed data streams is determined based on the selected subset of the endpoints, wherein each mixed data stream includes a contributing source identifier (CSRC) indicating endpoints associated with constituent decrypted data streams, each mixed data stream further including synchronization source identifiers (SSRCs) that indicate the endpoints that are associated with the decrypted generated data streams included in the mixed data stream, wherein the SSRCs are included in the CSRC associated with the mixed data stream;

preventing, using the conference bridge, data stream contributions by any given endpoint from being sent back to a same endpoint;

encrypting, using the conference bridge, the mixed data streams; and distributing, using the conference bridge, the encrypted mixed data streams by multicasting the encrypted mixed data streams to the one or more endpoints participating in the secure conferencing, wherein the conference bridge generates an output data stream for a multicast group.

* * * * *